US012364997B1

(12) United States Patent
Crenshaw

(10) Patent No.: US 12,364,997 B1
(45) Date of Patent: Jul. 22, 2025

(54) MODULAR MULTI-CONFIGURABLE SPRAYER

(71) Applicant: Kenneth D. Crenshaw, Millington, TN (US)

(72) Inventor: Kenneth D. Crenshaw, Millington, TN (US)

( * ) Notice: Subject to any disclaimer, the term of this patent is extended or adjusted under 35 U.S.C. 154(b) by 0 days.

(21) Appl. No.: 19/035,228

(22) Filed: Jan. 23, 2025

Related U.S. Application Data

(60) Provisional application No. 63/623,942, filed on Jan. 23, 2024.

(51) Int. Cl.
| | | |
|---|---|---|
| B05B 12/14 | (2006.01) | |
| A01M 7/00 | (2006.01) | |
| B05B 9/01 | (2006.01) | |

(52) U.S. Cl.
CPC ....... B05B 12/1409 (2013.01); A01M 7/0046 (2013.01); B05B 9/01 (2013.01)

(58) Field of Classification Search
CPC ..... B05B 12/1409; B05B 12/002; B05B 9/01; B05B 1/1609; B05B 1/3013; B05B 1/14; B05B 1/16; A01M 7/0046
See application file for complete search history.

(56) References Cited

U.S. PATENT DOCUMENTS

| | | | |
|---|---|---|---|
| 1,331,465 A | 2/1920 | Barrett | |
| 2,052,622 A * | 9/1936 | Hale | B05B 7/12 239/428 |
| 2,462,262 A | 2/1949 | Gustafsson et al. | |
| 2,726,898 A * | 12/1955 | Henriksson | B05B 1/1609 239/525 |
| D183,070 S | 6/1958 | Stillson | |
| 2,969,926 A | 1/1961 | Peeps | |

(Continued)

FOREIGN PATENT DOCUMENTS

| | | |
|---|---|---|
| AU | 2017218408 | 8/2018 |
| BR | 112018016424 | 12/2018 |

(Continued)

OTHER PUBLICATIONS

International Search Report and Written Opinion in corresponding International Application No. PCT/US2017/015803, dated May 11, 2017, 15 pp.

(Continued)

*Primary Examiner* — Tuongminh N Pham

(57) ABSTRACT

A fluid spray system is disclosed, featuring a modular design with interchangeable components. The system includes multiple inlet, outlet, and valve blocks, each with distinct configurations, allowing for customizable fluid flow paths. The valve blocks contain actuators that selectively connect the inlet and outlet blocks via tubes, facilitating fluid transfer. The sprayer housing, which houses the valve block, has an inlet and outlet opening for the inlet and outlet blocks, and includes a handle portion with a hollow handle guard. The system allows for precise control of fluid flow through separate inlet and outlet tubes positioned within the housing. The design includes safety features such as a safety selector to prevent accidental operation and trigger placement for ease of use. The system's modularity enables flexibility for different spraying applications, making it suitable for a wide range of fluid dispensing needs.

20 Claims, 12 Drawing Sheets

(56) References Cited

U.S. PATENT DOCUMENTS

| | | |
|---|---|---|
| 3,511,951 A | 5/1970 | Miller |
| 4,005,824 A | 2/1977 | Becker et al. |
| 4,915,304 A | 4/1990 | Campani |
| 5,221,026 A | 6/1993 | Williams |
| 5,236,129 A | 8/1993 | Grime et al. |
| D373,813 S | 9/1996 | Guo |
| D373,814 S | 9/1996 | Wang |
| D376,637 S | 12/1996 | Kieffer et al. |
| 5,667,143 A | 9/1997 | Sebion et al. |
| D405,159 S | 2/1999 | Kieffer |
| D407,140 S | 3/1999 | Heren |
| 5,979,800 A | 11/1999 | Takagi |
| 6,042,029 A | 3/2000 | Massey |
| 6,047,861 A | 4/2000 | Vidal et al. |
| D449,670 S | 10/2001 | Carpenter et al. |
| 6,311,871 B1 | 11/2001 | Binder |
| 6,378,789 B1 * | 4/2002 | Seaman, Jr. ........ B05B 7/1209 239/443 |
| D459,786 S | 7/2002 | Sweeton |
| 6,419,545 B1 | 7/2002 | Motosko |
| D463,509 S | 9/2002 | Huang |
| D464,707 S | 10/2002 | Wang |
| D470,220 S | 2/2003 | Nien |
| D474,256 S | 5/2003 | Hubmann et al. |
| D475,435 S | 6/2003 | Chen |
| 6,595,440 B2 | 7/2003 | Moriarty et al. |
| 6,685,107 B1 * | 2/2004 | Salzman ............ B05B 7/244 239/526 |
| D489,792 S | 5/2004 | Chen |
| D499,167 S | 11/2004 | Sweeton |
| D501,537 S | 2/2005 | Zeng |
| D501,538 S | 2/2005 | Zeng |
| D517,645 S | 3/2006 | Chang |
| D522,088 S | 5/2006 | Roman |
| 7,077,339 B2 | 7/2006 | Leach |
| D532,077 S | 11/2006 | Chen |
| D565,153 S | 3/2008 | Downey et al. |
| D578,603 S | 10/2008 | Khaitov |
| D588,231 S | 3/2009 | Pellin et al. |
| 7,568,636 B2 | 8/2009 | Saunders et al. |
| 8,136,698 B1 | 3/2012 | Beaulieu |
| D666,692 S | 9/2012 | Beaulieu |
| D674,849 S | 1/2013 | Wilson |
| D725,743 S | 3/2015 | Richter et al. |
| D726,872 S | 4/2015 | Thurgood et al. |
| D727,466 S | 4/2015 | Richter et al. |
| D749,696 S | 2/2016 | Thurgood et al. |
| D764,023 S | 8/2016 | Woodard |
| D787,326 S | 5/2017 | Hanson et al. |
| D792,944 S | 7/2017 | Cheng |
| D792,945 S | 7/2017 | Cheng |
| D799,003 S | 10/2017 | Wojan et al. |
| D799,005 S | 10/2017 | Wojan et al. |
| D800,255 S | 10/2017 | Chen |
| D800,868 S | 10/2017 | Crenshaw |
| 9,814,227 B2 | 11/2017 | Crenshaw |
| 9,821,332 B2 | 11/2017 | Adams et al. |
| D809,096 S | 1/2018 | Wang |
| D812,717 S | 3/2018 | Crenshaw |
| D820,952 S | 6/2018 | Chen |
| D820,953 S | 6/2018 | Chen |
| D821,544 S | 6/2018 | Urry |
| D821,545 S | 6/2018 | Gehrung |
| D824,486 S | 7/2018 | Urry |
| D824,492 S | 7/2018 | Chen |
| D830,506 S | 10/2018 | Gehrung et al. |
| D831,792 S | 10/2018 | Gehrung et al. |
| D838,340 S | 1/2019 | Svendsen et al. |
| D838,809 S | 1/2019 | Svendsen et al. |
| D851,212 S | 6/2019 | Crenshaw |
| D858,696 S | 9/2019 | Crenshaw |
| D858,697 S | 9/2019 | Crenshaw |
| 10,973,219 B2 | 4/2021 | Crenshaw |
| 11,856,942 B2 | 1/2024 | Crenshaw |
| 2002/0158143 A1 | 10/2002 | Moriarty et al. |
| 2004/0227014 A1 | 11/2004 | Williams et al. |
| 2005/0217652 A1 | 10/2005 | Styles |
| 2006/0272628 A1 | 12/2006 | Styles |
| 2007/0194148 A1 | 8/2007 | Rosko et al. |
| 2007/0267523 A1 | 11/2007 | Roumanis |
| 2011/0121105 A1 | 5/2011 | Moriarty et al. |
| 2011/0253810 A1 * | 10/2011 | Rieger ................ B05B 7/08 239/526 |
| 2012/0043364 A1 | 2/2012 | Coleman, Jr. |
| 2013/0048759 A1 * | 2/2013 | Aguilar ............ B05C 5/0291 239/562 |
| 2014/0042238 A1 | 2/2014 | Mather et al. |
| 2014/0217120 A1 | 8/2014 | Berry |
| 2014/0239094 A1 | 8/2014 | Munro |
| 2015/0017327 A1 | 1/2015 | Myers et al. |
| 2017/0231212 A1 | 8/2017 | Crenshaw |
| 2017/0252761 A1 | 9/2017 | Meuler et al. |
| 2017/0291184 A1 | 10/2017 | Tada |
| 2018/0027798 A1 | 2/2018 | Crenshaw |

FOREIGN PATENT DOCUMENTS

| | | |
|---|---|---|
| CA | 3012687 | 8/2017 |
| EP | 1930083 | 6/2008 |
| EP | 3414019 | 12/2018 |
| JP | 2013-066823 | 4/2013 |
| KR | 10-1502743 | 3/2015 |
| WO | WO 2005/018814 | 3/2005 |
| WO | WO 2017/139135 | 8/2017 |

OTHER PUBLICATIONS

European Patent Office: Extended European Search Report for corresponding European Application No. 17750579.9 dated Sep. 2, 2019, 8 pages.

Canada Intellectual Property Office: Office Action for co-pending Canadian Patent Application No. 3,012,687 dated Oct. 11, 2019, 3 pages.

Office Action for co-pending Canadian Patent Application No. 3,012,687 dated Feb. 26, 2020, 4 pages.

Examination Report for corresponding Australian Patent Application No. 2017218408 dated Nov. 17, 2021, 2 pages.

Office Action for corresponding Brazilian Patent Application No. 112018016424-0 dated Jan. 31, 2017, 4 pgs.

* cited by examiner

MODULAR MULTI-CONFIGURABLE SPRAYER

CROSS-REFERENCES TO RELATED APPLICATIONS

This is a non-provisional patent application claiming priority to U.S. Provisional Patent Application Ser. No. 63/623,942 filed Jan. 23, 2024, and entitled "Modular Multi-Configurable Sprayer", which is incorporated in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

1. Field of the Invention

The present disclosure relates generally to a fluid spray apparatus. More particularly, the present disclosure pertains to a multi-configurable fluid spray apparatus including one or more inlets, one or more outlets, and one or more actuators configured to selectively communicate the one or more inlets with the one or more outlets.

2. Description of the Prior Art

Fluid spray guns are a well-known in the field of vegetation management. In the context of herbicide applications, there are spray guns equipped with adjustable nozzles designed for user manipulation by twisting back and forth. These nozzles allow users to apply herbicide in a fan-type pattern for nearby targets and in a straight stream pattern for distant targets, creating smaller droplets near the intended point of impact. However, adjusting the nozzle requires the user to momentarily disengage from the backpack pumping lever and physically manipulate the nozzle, potentially coming into contact with herbicide-covered parts. This process can be inconvenient and fatiguing for the user, leading to a tendency to keep the nozzle in the straight stream setting. Unfortunately, maintaining the straight stream pattern may result in over-penetration of nearby targets, causing suboptimal performance, environmental issues, and unnecessary wastage of herbicide.

BRIEF SUMMARY

In view of at least some of the above-referenced problems associated with fluid spray guns, an exemplary object of the present disclosure may be to provide a new fluid spray apparatus with substitutable parts configurable in a multitude of arrangements depending upon the needs of a user. Certain configurations of the fluid spray device described in the present disclosure enable the application of various spray patterns and/or alternating between different fluids with a single hand, facilitating swift and effortless transitions between different patterns and/or fluids. Additionally, these embodiments may offer the flexibility of optionally reversing the relationship between the actuator and its output. These embodiments may also provide additional optional configurations such as, for example, (1) a dual-inlet dual outlet configuration which allows for two fluids (or chemicals) to be selectively sprayed from two different outlets having the same or different spray pattern, (2) a single-inlet dual-outlet configuration which allows for a single fluid (or chemical) to be selectively sprayed from two different outlets having the different spray patterns, (3) an injector-style configuration whereby two fluids (or chemicals) are fed to the sprayer via a coaxial or dual fluid line with one fluid being able to be injected into the expulsion stream of the other, or various other configurations as will be apparent to one of skill in the art based on the teachings contained herein.

The present disclosure features a fluid spray system that includes a modular, customizable design, offering flexibility for users to configure and modify the system based on specific needs. The system comprises a sprayer housing, interchangeable inlet blocks, outlet blocks, and valve blocks, each having distinct configurations to accommodate a variety of fluid spray applications. The sprayer housing includes a hollow interior with inlet and outlet openings for receiving corresponding inlet and outlet blocks, while a handle portion allows for comfortable operation. The valve blocks, which are also interchangeable, include actuators that control the fluid flow between the inlet and outlet blocks. Furthermore, the different inputs and outputs of the valve blocks may be sized to meter different input fluids relative to each other. The sprayer housing may also be interchangeable, for example, allowing users to select custom colors, shapes, grips, sizes and the like.

The system enables users to select from a variety of configurations, such as a dual-inlet dual-outlet setup, a single-inlet dual-outlet configuration, an injector-style arrangement, or any other arrangement, as directly described herein or will be apparent to one of skill in the art based on the teachings contained herein, allowing for efficient application of one or multiple fluids with varying spray patterns and/or relationships. The system may also be configured to allow the inversion of the actuator-output relationship for more control over the spray process. Additionally, the inclusion of safety features, such as a safety selector to prevent accidental actuation, and multiple actuator options for fluid control, further enhances the system's versatility and user convenience. The modular design ensures that the fluid spray apparatus can be quickly adapted for various tasks, promoting ease of use and flexibility for a wide range of applications.

In a particular embodiment, an exemplary fluid spray system as disclosed herein may include a plurality of interchangeable inlet blocks, a plurality of interchangeable outlet blocks, a plurality of interchangeable valve blocks, and a sprayer housing. Each of the pluralities of interchangeable inlet, outlet, and valve blocks may have a different configuration. Each of the plurality of interchangeable valve blocks may include first and second actuators configured to fluidly communicate at least a portion of one of the plurality of interchangeable inlet blocks with at least a portion of one of the plurality of interchangeable outlet blocks using a plurality of tubes. The sprayer housing may include a hollow interior, an inlet opening, and an outlet opening. The inlet opening may be configured to receive one of the plurality of interchangeable inlet blocks. The outlet opening may be configured to receive one of the plurality of interchangeable outlet blocks. The hollow interior of the sprayer housing may be configured to receive one of the plurality of the interchangeable valve blocks.

In an exemplary aspect according to the above-referenced embodiment, a first valve block of the plurality of interchangeable valve blocks includes a lower inlet, a lower outlet, an upper inlet, and an upper outlet. The upper inlet may be selectively communicated with the upper outlet using the first actuator, and the lower inlet may be selectively communicated with the lower outlet using the second actuator.

In another exemplary aspect according to the above-referenced embodiment, a first inlet block of the plurality of interchangeable inlet blocks may include first and second inlets coupled to different ones of the upper and lower inlets of the first valve block. A first outlet block of the plurality of interchangeable outlet blocks may include first and second outlets coupled to different ones of the upper and lower outlets of the first valve block.

In another exemplary aspect according to the above-referenced embodiment, a first outlet tube of the plurality of tubes may be coupled between the upper outlet of the first valve block and the first outlet of the first outlet block. A second outlet tube of the plurality of tubes may be coupled between the lower outlet of the first valve block and the second outlet of the first outlet In another exemplary aspect according to the above-referenced embodiment, the sprayer housing may include a handle portion and a hollow handle guard coupled between upper and lower ends of the handle portion and open to the hollow interior. At portion of the second outlet tube may be positioned within the hollow handle guard.

In another exemplary aspect according to the above-referenced embodiment, a second valve block of the plurality of interchangeable valve blocks may include a lower inlet, a lower outlet, and an upper outlet. The lower inlet may be selectively communicated with the upper outlet via an internal passageway of the second valve block using the first actuator, and the lower inlet further may be selectively communicated with the lower outlet using the second actuator.

In another exemplary aspect according to the above-referenced embodiment, a second inlet block of the plurality of interchangeable inlet blocks may include a single inlet coupled to the lower inlet of the second valve block. A first outlet block of the plurality of interchangeable outlet blocks may include first and second outlets coupled to different ones of the upper and lower outlets of the second valve block.

In another exemplary aspect according to the above-referenced embodiment, a first outlet tube of the plurality of tubes may be coupled between the upper outlet of the first valve block and the first outlet of the first outlet block. A second outlet tube of the plurality of tubes may be coupled between the lower outlet of the first valve block and the second outlet of the first outlet In another exemplary aspect according to the above-referenced embodiment, the sprayer housing may include a handle portion and a hollow handle guard coupled between upper and lower ends of the handle portion and open to the hollow interior. At least a portion of the second outlet tube may be positioned within the hollow handle guard.

In another exemplary aspect according to the above-referenced embodiment, a third valve block of the plurality of interchangeable valve blocks may include a lower inlet, an upper inlet, and an upper outlet. The upper inlet may be selectively communicated with the upper outlet using the first actuator, and the lower inlet further may be selectively communicated with the upper outlet via an internal passageway of the third valve block using the second actuator.

In another exemplary aspect according to the above-referenced embodiment, a third inlet block of the plurality of interchangeable inlet blocks may comprise an injector-style single inlet block including a single coaxial external inlet and first and second internal outlets coupled to different ones of the upper and lower inlets of the third valve block. A second outlet block of the plurality of interchangeable outlet blocks may include a single outlet coupled to the upper outlet of the third valve block.

In another exemplary aspect according to the above-referenced embodiment, a first inlet tube of the plurality of tubes may be coupled between the first internal outlet of the third inlet block and the lower inlet of the third valve block. A second inlet tube of the plurality of tubes may be coupled between the second internal outlet of the third inlet block and the upper inlet of the third valve block.

In another exemplary aspect according to the above-referenced embodiment, the sprayer housing may include a handle portion and a hollow handle guard coupled between upper and lower ends of the handle portion and open to the hollow interior. At least a portion of the second inlet tube may be positioned within the hollow handle guard.

In another exemplary aspect according to the above-referenced embodiment, the sprayer housing may include a handle portion and a hollow handle guard coupled between upper and lower ends of the handle portion and open to the hollow interior. The fluid spray system may further include first and second triggers configured to selectively actuate the first and second actuators, respectively. The first trigger may be pivotally coupled to the handle closer to the upper end than to the lower end, and the second trigger may be pivotally coupled to the handle closer to the lower end than to the upper end.

In another exemplary aspect according to the above-referenced embodiment, the handle portion may include a safety selector positioned between the upper and lower ends of the handle portion. The safety selector may be configured to selectively prevent the first and second triggers from being able to actuate the first and second actuators.

In another exemplary aspect according to the above-referenced embodiment, the inlet opening of the sprayer housing may be positioned at a lower end of the handle portion.

In another exemplary aspect according to the above-referenced embodiment, the inlet opening of the sprayer housing may be positioned at an upper rear end of the sprayer housing above the handle portion.

In another exemplary aspect according to the above-referenced embodiment, the outlet opening may be positioned at an upper forward end of the sprayer housing.

In another exemplary aspect according to the above-referenced embodiment, the sprayer housing may be a two-piece housing having a first portion and a second portion.

In another exemplary aspect according to the above-referenced embodiment, the first and second portions of the sprayer housing may bisect the sprayer housing into two approximately equal halves.

In another embodiment, an exemplary fluid spray apparatus as disclosed herein may include a sprayer housing, an interchangeable inlet block, an interchangeable outlet block, an interchangeable valve block, and a plurality of tubes. The sprayer housing may include a hollow interior, an inlet opening, and an outlet opening, a handle portion, and a hollow handle guard coupled between upper and lower ends of the handle portion and open to the hollow interior. The interchangeable inlet block may be configured to be received by the inlet opening and may include at least one inlet. The interchangeable outlet block may be configured to be received by the outlet opening and may include at least one outlet. The interchangeable valve block may be positioned within the hollow interior at the handle portion of the two-piece sprayer housing. The interchangeable valve block may include first and second actuators extending from the two-piece sprayer housing towards the hollow handle guard. The interchangeable valve block may be configured to selectively communicate the interchangeable inlet block with the interchangeable outlet block. The plurality of tubes may be positioned within the two-piece sprayer housing and be selectively coupled between the interchangeable inlet block, the interchangeable valve block, and the interchangeable outlet block. At least a portion of one or more of the plurality of tubes may be positioned within the hollow handle guard extending between the upper and lower ends of the handle portion.

Numerous other objects, advantages and features of the present disclosure will be readily apparent to those of skill in the art upon a review of the following drawings and description of a preferred embodiment.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
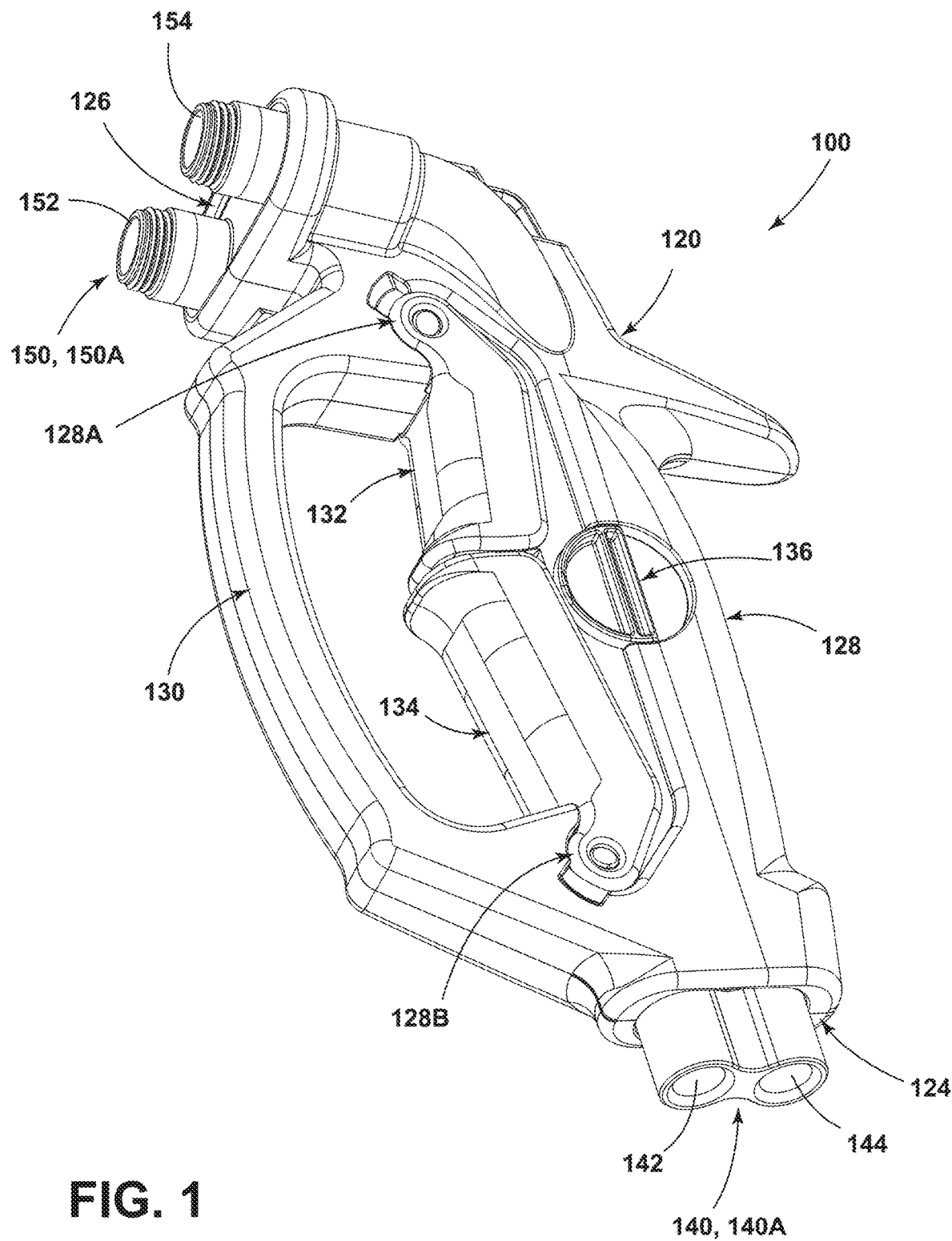
FIG. 1 is a perspective view of an embodiment of a fluid spray apparatus in accordance with the present disclosure.
Figure 2:
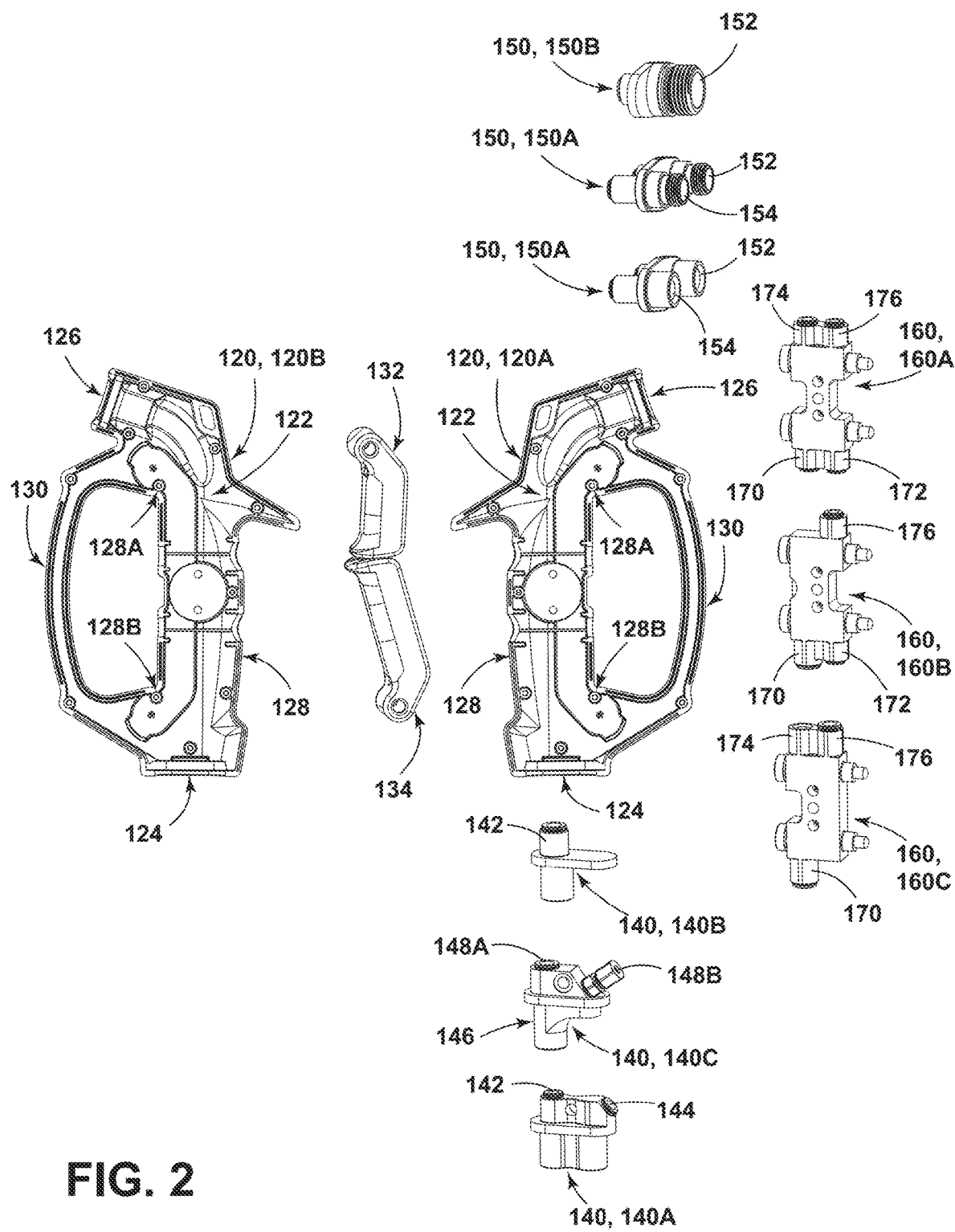
FIG. 2 is an exploded view of the fluid spray apparatus of FIG. 1 including several substitutable parts in accordance with the present disclosure.

Referring to FIGS. 1-10, a fluid sprayer apparatus 100 is shown. The fluid sprayer apparatus 100 provides a modular solution to the problems associated with prior fluid spray guns. As illustrated in FIG. 2, the fluid sprayer apparatus 100 may also be referred to herein as a fluid sprayer system 200 which includes many parts which may be swapped out or interchanged depending upon the specific needs of a user, as discussed further below.

The fluid sprayer apparatus 100 may include a two-piece sprayer housing 120, an interchangeable inlet block 140, an interchangeable outlet block 150, and an interchangeable valve block 160. The two-piece sprayer housing 120 may also be referred to herein as a sprayer housing 120, a clamshell housing 120, or a housing 120. The sprayer housing 120 may include a hollow interior 122, an inlet opening 124, an outlet opening 126, a handle portion 128, and a hollow handle guard 130 coupled between an upper end 128A and a lower end 128B of the handle portion 128 and open to the hollow interior 122. The hollow handle guard 130 may also be referred to herein as a hollow trigger guard 130 or a trigger guard 130. As illustrated in FIG. 2, the sprayer housing 120 may comprise first portion 120A and a second portion 120B which may be separated to gain access to the hollow interior 122. The first and second portions 120A, 120B may bisect the sprayer housing 120 into two approximately equal halves. The first and second portions 120A, 120B may be coupled together using removable fasteners such that the sprayer housing 120 may easily be disassembled when and if necessary. In certain optional embodiments, the shape, size, color, grip, grip texture, or the like can be custom selected by a customer, thus allowing the sprayer housing 120 to also be interchangeable and customizable depending on user preferences. These features of the sprayer housing 120 may be customizable while allowing the interchangeable inlet block 140, outlet block 150, and valve block 160 to still be interchangeably used with the sprayer housing 120.

The interchangeable inlet block 140 may be configured to be received by the inlet opening 124. The interchangeable outlet block 150 may be configured to be received by the outlet opening 126. The interchangeable valve block 160 may be positioned within the hollow interior 122 of the sprayer housing 120. The interchangeable valve block 160 may particularly be positioned with the hollow interior 122 of the handle portion 128 of the sprayer housing 120. The interchangeable valve block 160 may include a first actuator 162 and a second actuator 164, each of which may extend externally from the sprayer housing 120 towards the hollow handle guard 130. The first actuator 162 may also be referred to as an upper actuator 162, and the second actuator 164 may also be referred to herein as a lower actuator 164. The interchangeable valve block 160 may be configured to selectively communicate the interchangeable inlet block 140 with the interchangeable outlet block 150.

As illustrated in FIGS. 3-8, the fluid sprayer apparatus 100 may further include a plurality of tubes 102 positioned within the hollow interior 122 of the sprayer housing 120 for enabling fluid communication between the interchangeable inlet block 140 and the interchangeable outlet block 150 as directed by the valve block 160. Each of the plurality of tubes 102 may be coupled between two of the interchangeable inlet block 140, the interchangeable outlet block 150, or the interchangeable valve block 160. In some embodiments, at least a portion of one or more of the plurality of tubes 102 may be positioned within the hollow handle guard 130. The hollow handle guard 130 may act as a conduit for one or more of the plurality of tubes 102 to travel from the lower end 128B of the handle portion 128 to the upper end 128A of the handle portion 128 in order to reduce a required girth of the handle portion 128. As the interchangeable valve block 160 may be positioned within the handle portion 128, there is a limited amount of space to accommodate one or more of the plurality of tubes 102 without increasing the circumference of the handle portion 128 which may be limited due to typical hand sizes and ergonomic considerations.

As illustrated in FIG. 1, the fluid sprayer apparatus 100 may further include first and second triggers 132, 134 configured to selectively engage and actuate the first and second actuators 162, 164, respectively. The first trigger 132 may be pivotally coupled to the sprayer housing 120 at or proximate to the upper end 128A of the handle portion 128 (e.g., closer to the upper end 128A than to the lower end 128B) and the second trigger 134 may be pivotally coupled to the sprayer housing 120 at or proximate to the lower end 128B of the handle portion 128 (e.g., closer to the lower end 128B than to the upper end 128A). The first trigger 132 may also be referred to herein as an upper trigger 132, and the second trigger 134 may also be referred to therein as a lower trigger 134. In other embodiments, the first and second triggers 132, 134 may be coupled to the sprayer housing 120 in a different manner or coupled directly to the first and second actuators 162, 164, respectively. The handle portion 128 includes a safety selector 136 positioned between the upper and lower ends 128A, 128B of the handle portion 128. The safety selector 136 may also be referred to herein as a trigger locking mechanism 136. The safety selector 136 may be rotatably coupled to the handle portion 128 and further be configured to selectively prevent the first and second triggers 132, 134 from being able to actuate the first and second actuators 162, 164. The safety selector 136 may optionally be partially rotated in order to only prevent one of the first or second actuators 162, 164 from being able to actuate.

Referring to FIG. 2, the fluid sprayer system 200 may include the sprayer housing 120, a plurality of interchangeable inlet blocks (e.g., 140A, 140B, 140C), a plurality of interchangeable outlet blocks (e.g., 150A, 150B), and a plurality of interchangeable valve blocks (e.g., 160A, 160B, 160C). As such, the fluid sprayer apparatus 100 may include the sprayer housing 120, one of the plurality of inlet blocks, one of the plurality of outlet blocks, and one of the plurality of valve blocks.

Figure 3:
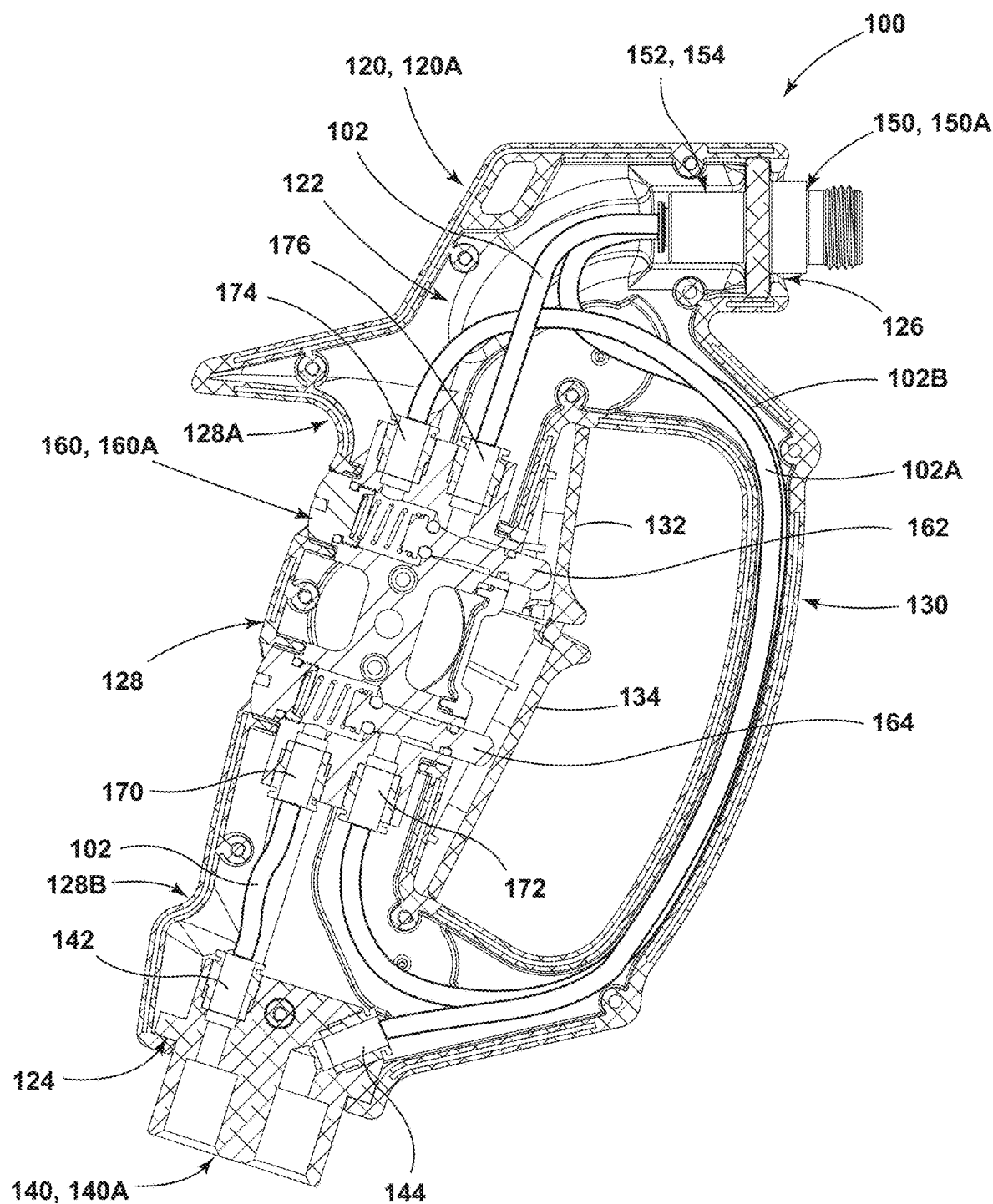
FIG. 3 is an open side view of an embodiment of the fluid spray apparatus of FIG. 1 in a first configuration in accordance with the present disclosure.
Figure 4:
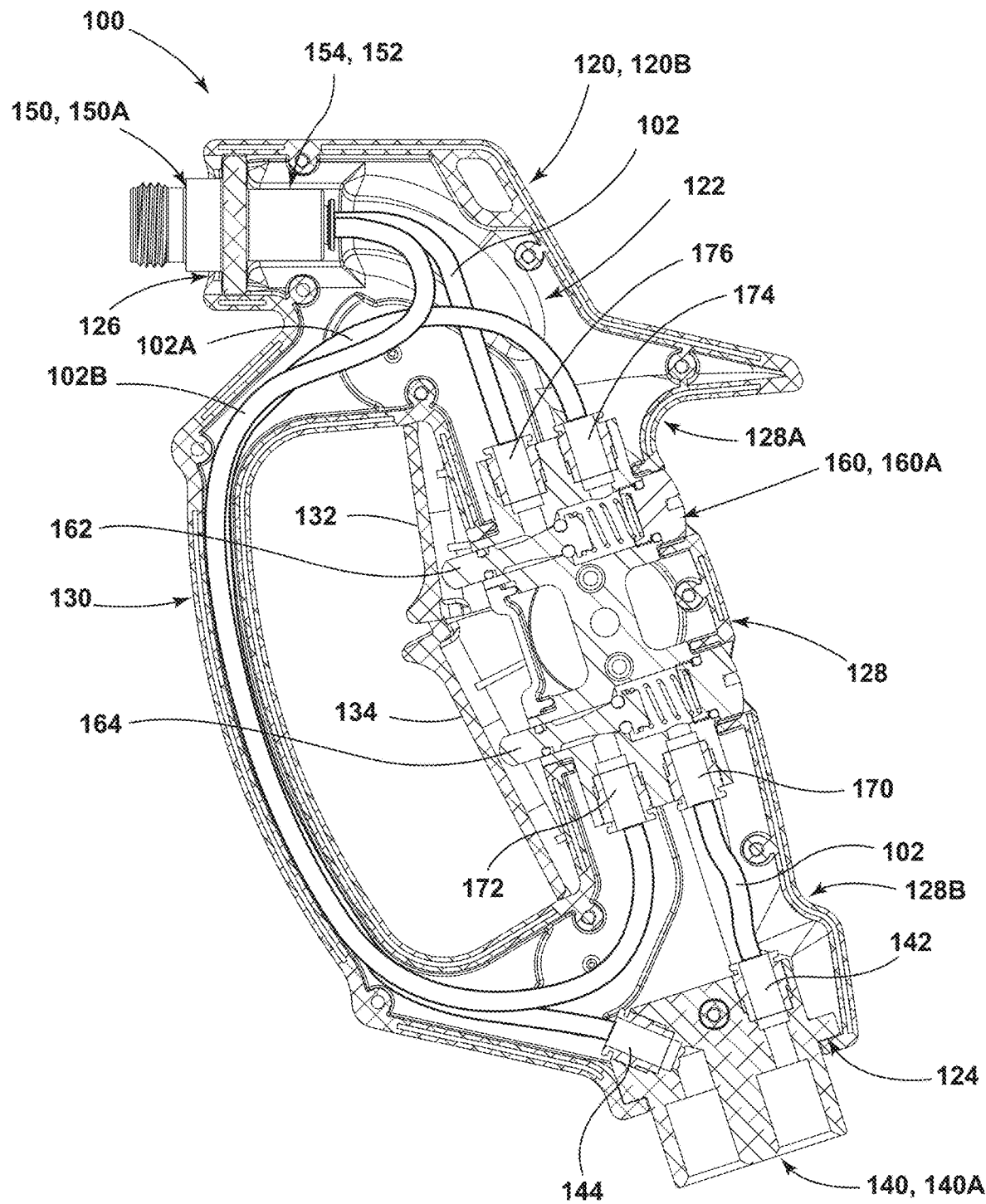
FIG. 4 is a cross-sectional side view of the fluid spray apparatus of FIG. 3 in a first configuration in accordance with the present disclosure.

As illustrated in FIGS. 3-4, the fluid sprayer apparatus 100 may be configured to receive two different fluids and expel each in a different or same pattern. In accordance with this embodiment, a first valve block 160A of the plurality of interchangeable valve blocks 160 may include a lower inlet 170, a lower outlet 172, an upper inlet 174, and an upper outlet 176. The upper inlet 174 may be configured to be selectively communicated with the upper outlet 176 when the first actuator 162 is actuated or engaged. The lower inlet 170 may be configured to be selectively communicated with the lower outlet 172 when the second actuator 164 is actuated or engaged.

In accordance with this embodiment, a first inlet block 140A may be positioned in the inlet opening 124 of the sprayer housing 120 and a first outlet block 150A may be positioned in the outlet opening 126 of the sprayer housing 120. The first inlet block 140A may include a first inlet 142 and a second inlet 144, and the first outlet block 150A may include a first outlet 152 and a second outlet 154. Each of the first and second inlets 142, 144 of the first inlet block 140A may be coupled to different ones of the lower inlet 170 or the upper inlet 174 of the first valve block 160A using one or more of the plurality of tubes 102. Similarly, each of the first and second outlets 152, 154 of the first outlet block 150A may be coupled to different ones of the lower outlet 172 or the upper outlet 176 of the first valve block 160A using one or more of the plurality of tubes 102. At least a portion of a tube 102A of the plurality of tubes 102 connected between the first inlet block 140A and the upper inlet 174 of the first valve block 160A may be positioned within the hollow handle guard 130. Similarly, at least a portion of a tube 102B of the plurality of tubes 102 connected between the lower outlet 172 of the first valve block 160A and the first outlet block 150A may be positioned within the hollow handle guard 130.

Figure 5:
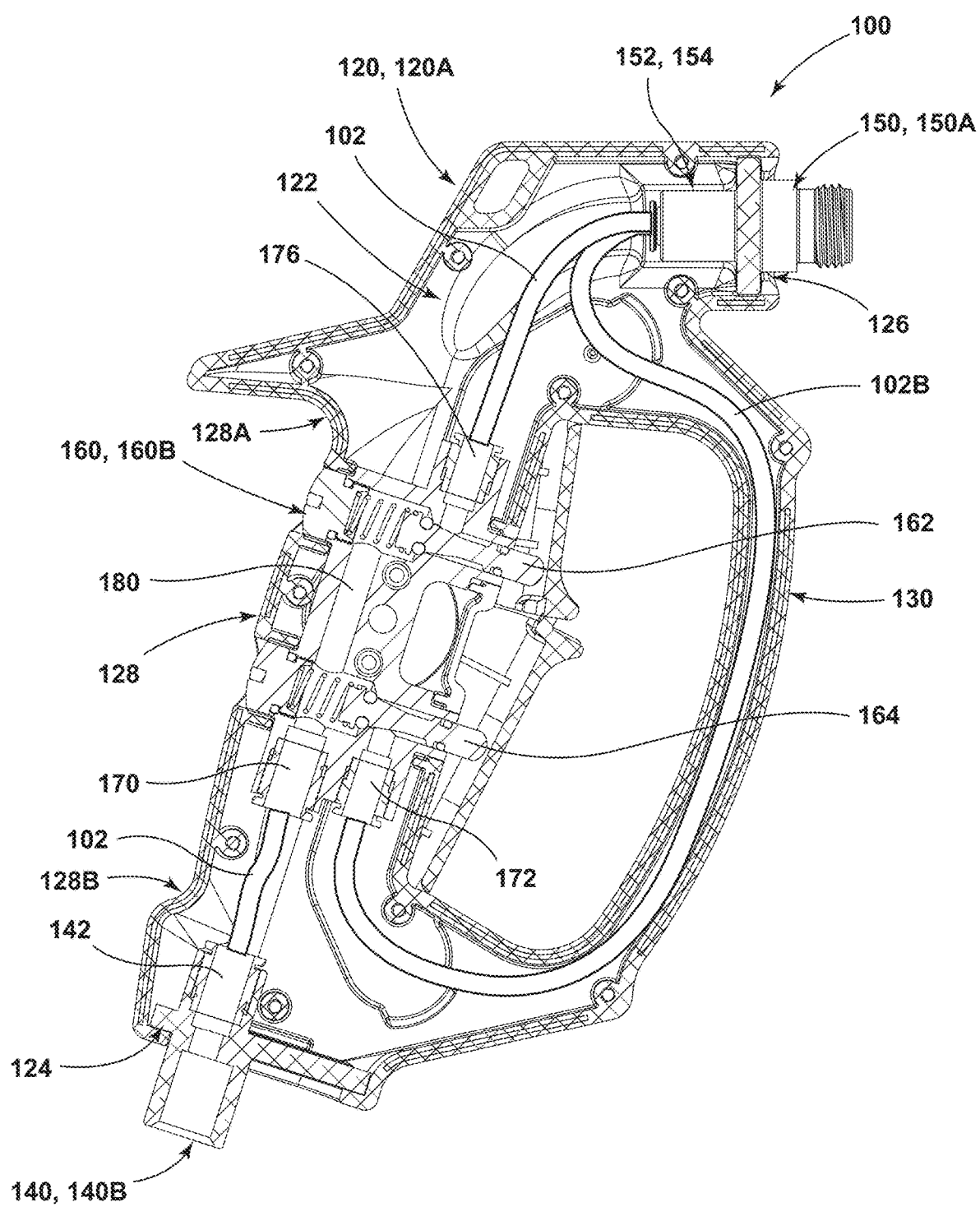
FIG. 5 is an open side view of an embodiment of the fluid spray apparatus of FIG. 1 in a second configuration in accordance with the present disclosure.
Figure 6:
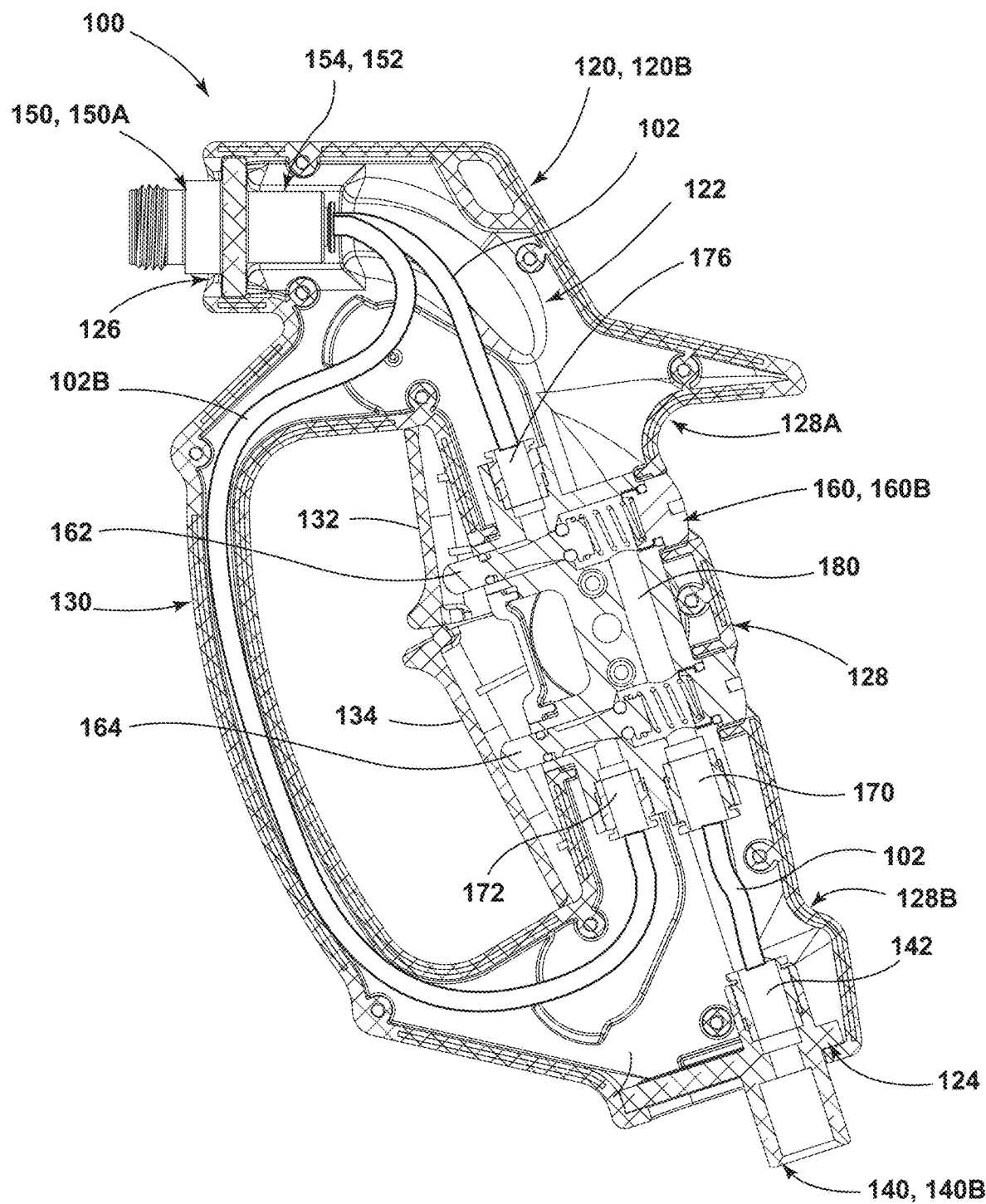
FIG. 6 is a cross-sectional side view of the fluid spray apparatus of FIG. 5 in the second configuration in accordance with the present disclosure.

As illustrated in FIGS. 5-6, the fluid sprayer apparatus 100 may be configured to receive a single fluid and expel the single fluid via first or second outlets depending upon which for the first or second triggers 132, 134 is engaged. In accordance with this embodiment, a second valve block 160B of the plurality of interchangeable valve blocks 160 may include a lower inlet 170, a lower outlet 172, and an upper outlet 176. Note that the second valve block 160B does not include an upper inlet. The lower inlet 170 may be configured to be selectively communicated with the upper outlet 176 via a second valve internal passageway 180 when the first actuator 162 is actuated or engaged. The lower inlet 170 may be configured to be selectively communicated with the lower outlet 172 when the second actuator 164 is actuated or engaged.

In accordance with this embodiment, a second inlet block 140B may be positioned in the inlet opening 124 of the sprayer housing 120 and the first outlet block 150A may be positioned in the outlet opening 126 of the sprayer housing 120. The second inlet block 140B may include a first inlet 142 only. The first inlet 142 of the second inlet block 140B may be coupled to the lower inlet 170 of the second valve block 160B using one of the plurality of tubes 102. Each of the first and second outlets 152, 154 of the first outlet block 150A may be coupled to different ones of the lower outlet 172 or the upper outlet 176 of the first valve block 160A using one or more of the plurality of tubes 102. At least a portion of a tube 102B of the plurality of tubes 102 connected between the lower outlet 172 of the first valve block 160A and the first outlet block 150A may be positioned within the hollow handle guard 130.

Referring to FIGS. 7-10, the fluid sprayer apparatus 100 may be configured as a lawn sprayer or chemical injector-style sprayer. As such, two different fluids (e.g., a main fluid and a secondary fluid) may be received by the fluid sprayer apparatus 100 via a coaxial fluid line (e.g., with one tube inside the other). The main fluid may be expelled in isolation of the secondary fluid using one of the triggers, the secondary fluid may be expelled using the other trigger, or the secondary fluid may be injected into the main fluid for expulsion using both triggers simultaneously. The main fluid may, for example, be a fertilizer and/or a cheaper herbicide mix and the secondary fluid may, for example, be a more expensive or targeted herbicide. In other embodiments, the main fluid and secondary fluid may be any useful fluid sought to be primarily sprayer and/or injected into a primary spray. The difference between FIGS. 7-8 and FIGS. 9-10 is that the inlet opening 124 is positioned at an upper rear end of the sprayer housing 120 above the handle portion 128 rather than at a lower end of the sprayer housing 120 below the handle portion 128. This difference may generally be related to ergonomic purposes. The outlet opening 126 may generally be positioned at an upper forward end of the sprayer housing 120. In certain optional embodiments (not illustrated), embodiments of the first and second inlet blocks 140a, 140B may be received by the inlet opening 124 when positioned at the upper rear end of the sprayer housing 120.

In accordance with this embodiment, a third valve block 160C of the plurality of valve blocks may include a lower inlet 170, an upper inlet 174, and an upper outlet 176. Note that the third valve block 160C does not include a lower outlet. The upper inlet 174 may be configured to be selectively communicated with the upper outlet 176 when the first actuator 162 is actuated or engaged. The lower inlet 170 may be configured to be selectively communicated with the upper outlet 176 via a third valve internal passageway 182 when the second actuator 164 is actuated or engaged. In some embodiments, the first trigger 132 may be linked with the second trigger 134 such that when the first trigger 132 is engaged so is the second trigger 134, however, the second trigger 134 can be engaged without causing the first trigger 132 to be engaged. Alternatively, in some embodiments, the second trigger 134 may be linked with the first trigger 132 such that when the second trigger 134 is engaged so is the first trigger 132, however, the first trigger 132 can be engaged without causing the second trigger 134 to be engaged.

Figure 7:
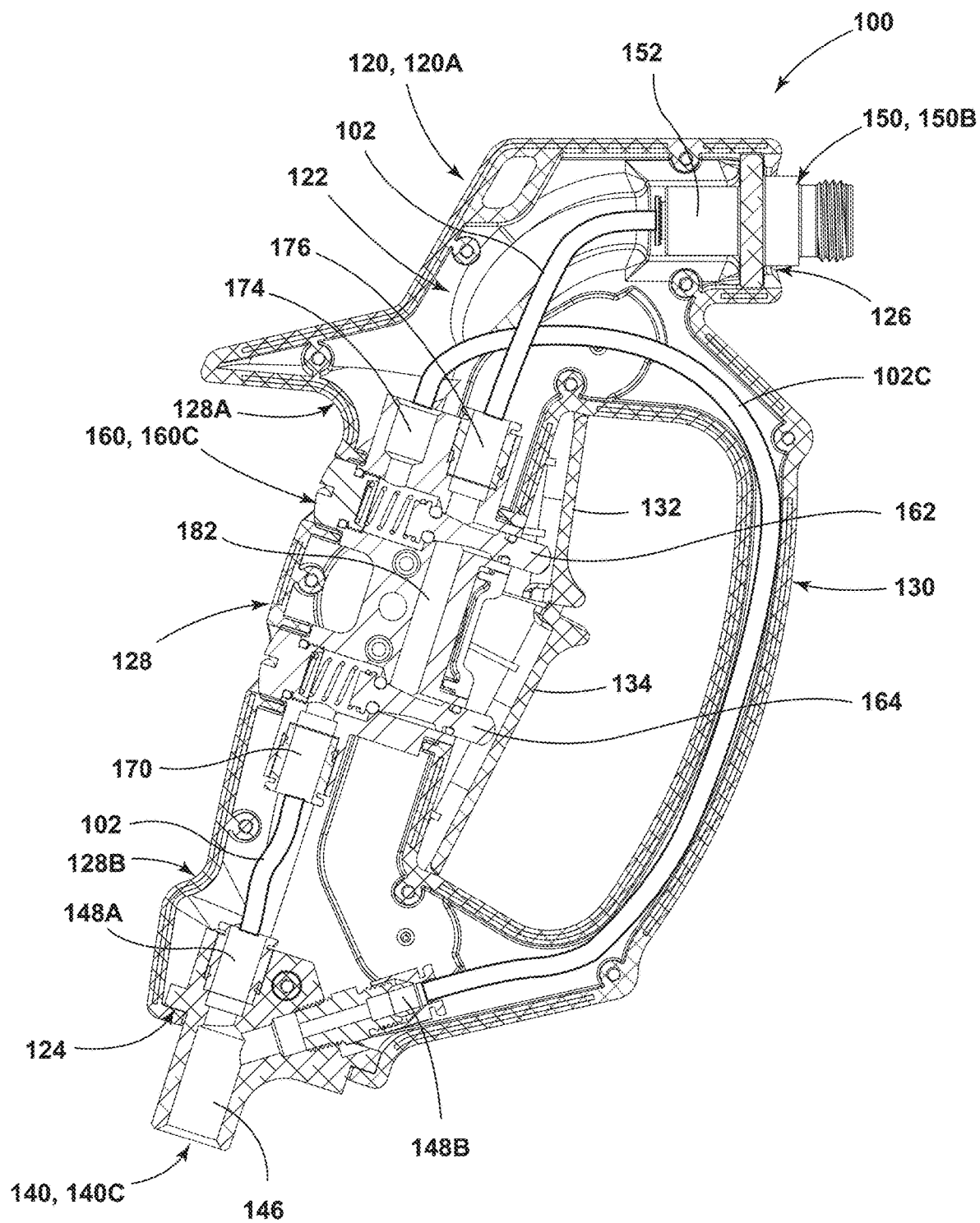
FIG. 7 is an open side view of an embodiment of the fluid spray apparatus of FIG. 1 in a third configuration in accordance with the present disclosure.
Figure 8:
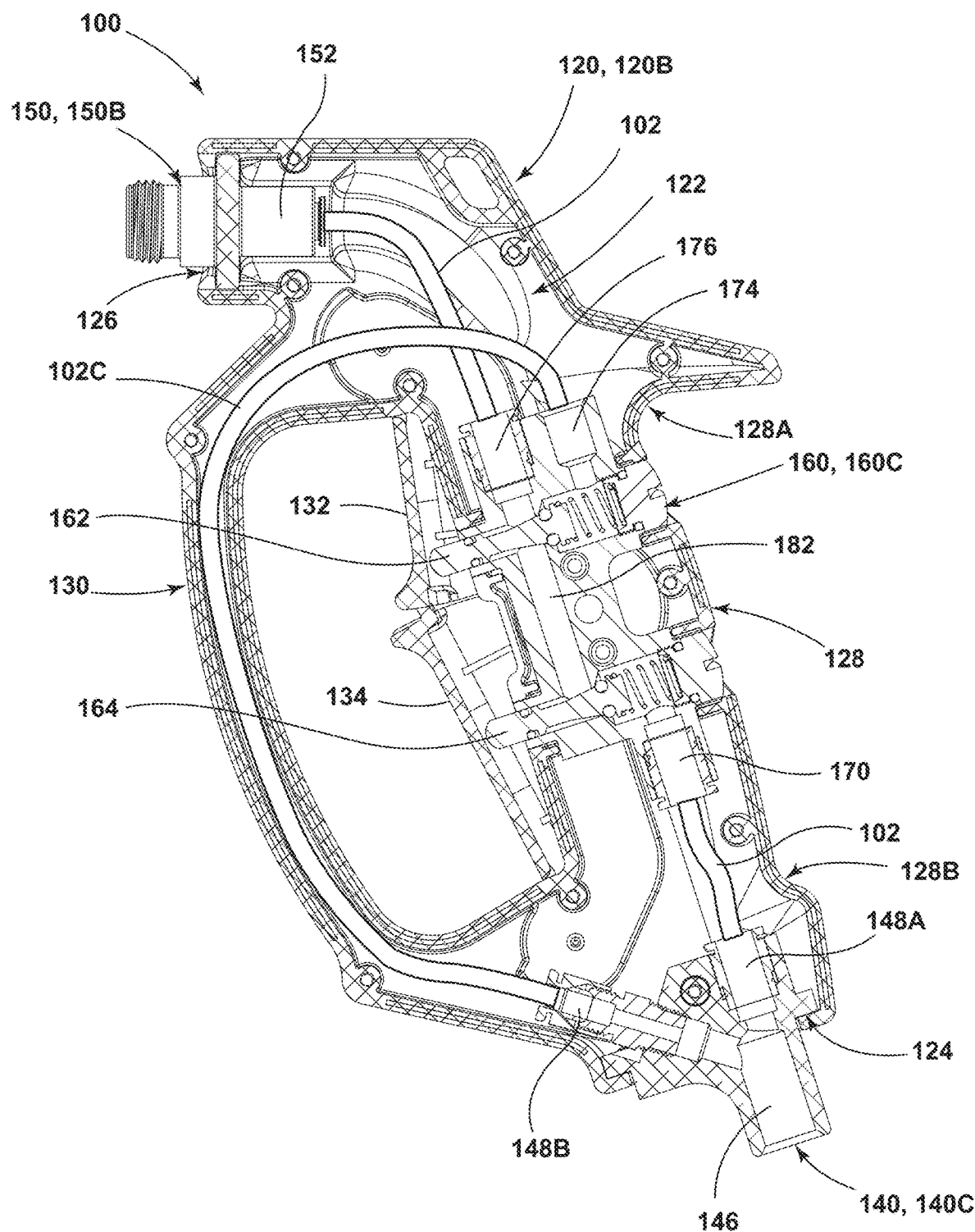
FIG. 8 is a cross-sectional side view of the fluid spray apparatus of FIG. 7 in the third configuration in accordance with the present disclosure.

In accordance with this embodiment, a third inlet block 140C may be positioned in the inlet opening 124 of the sprayer housing 120 and a second outlet block 150B may be positioned in the outlet opening 126 of the sprayer housing 120. The third inlet block 140C may also be referred to herein as an injector-style inlet block 140C. The third inlet block 140C may include a single external inlet 146 which splits in to first and second internal outlets 148A, 148B. The first internal outlet 148A of the third inlet block 140C may be coupled the lower inlet 170 of the third valve block 160C using one of the plurality of tubes 102. The second internal outlet 148B of the third inlet block 140C may be coupled to the upper inlet 174 of the third valve block 160C using one of the plurality of tubes 102. The upper outlet 176 of the third valve block 160C may be coupled to singular outlet 152 of the second outlet block 150B using one of the plurality of tubes 102. As illustrated in FIGS. 7-8, at least a portion of a tube 102C of the plurality of tubes 102 connected between second internal outlet 148B of the third inlet block 140C and the upper inlet 174 of the third valve block 160C may be positioned within the hollow handle guard 130. In certain optional embodiment, a lawn sprayer or chemical injector-style sprayer may be implemented using the first inlet block 140A in place of the third inlet block 140C.

By way of example, the lawn sprayer may utilize the bottom trigger as the Main Mix trigger. The design may use the bottom trigger to feed the main mix such as a fertilizer, or a cheaper herbicide mix, then the top trigger will be depressed to inject herbicide or the more expensive herbicide into the stream. In certain optional embodiments, as discussed above, the bottom trigger may be engaged without engaging the top trigger, but if the top trigger is engaged, then the bottom trigger is automatically engaged in response thereto. In other optional embodiments, this arrangement may be swapped or removed entirely.

Figure 9:
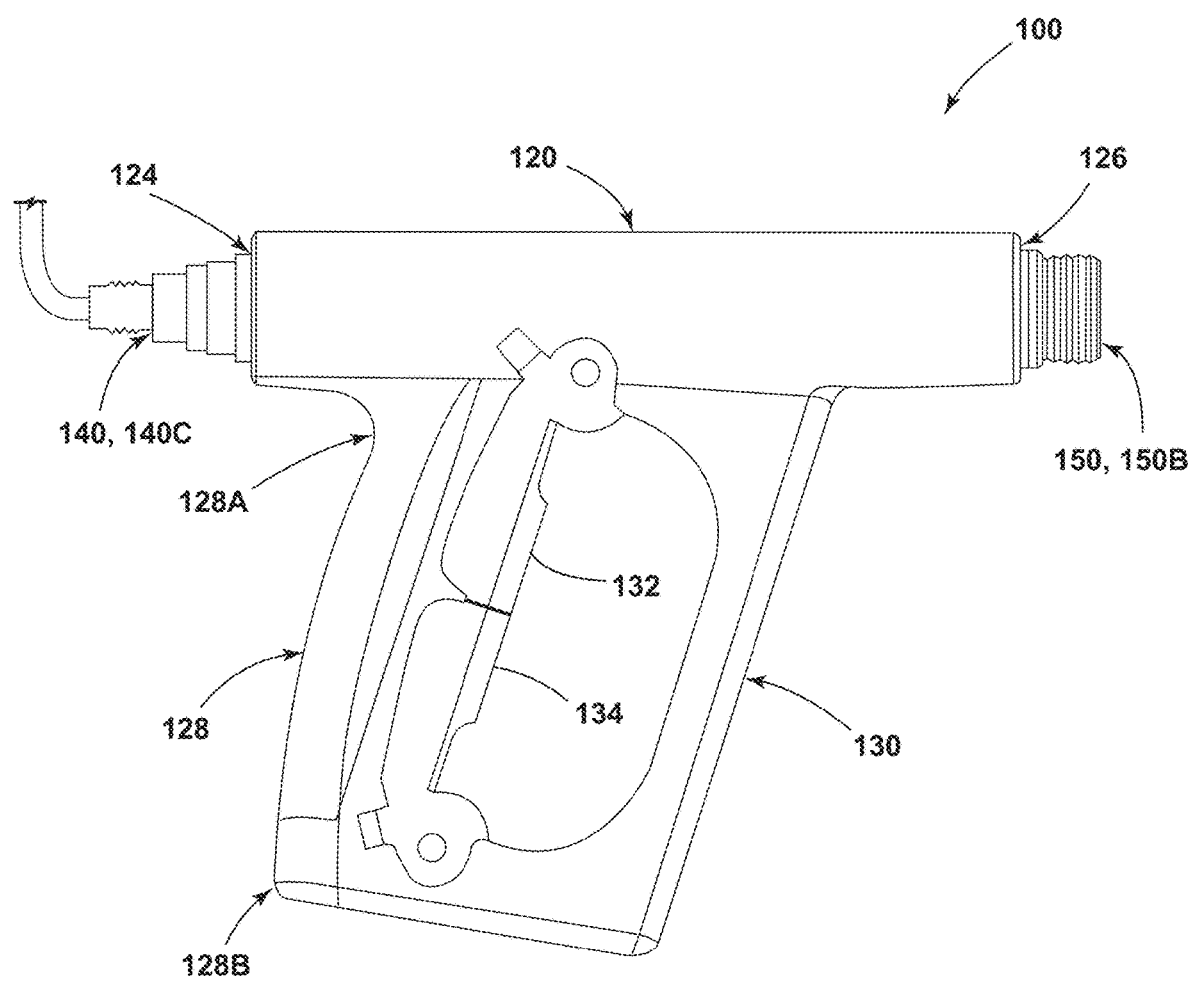
FIG. 9 is a side view of an embodiments of a fluid spray apparatus. in accordance with the present disclosure.
Figure 10:
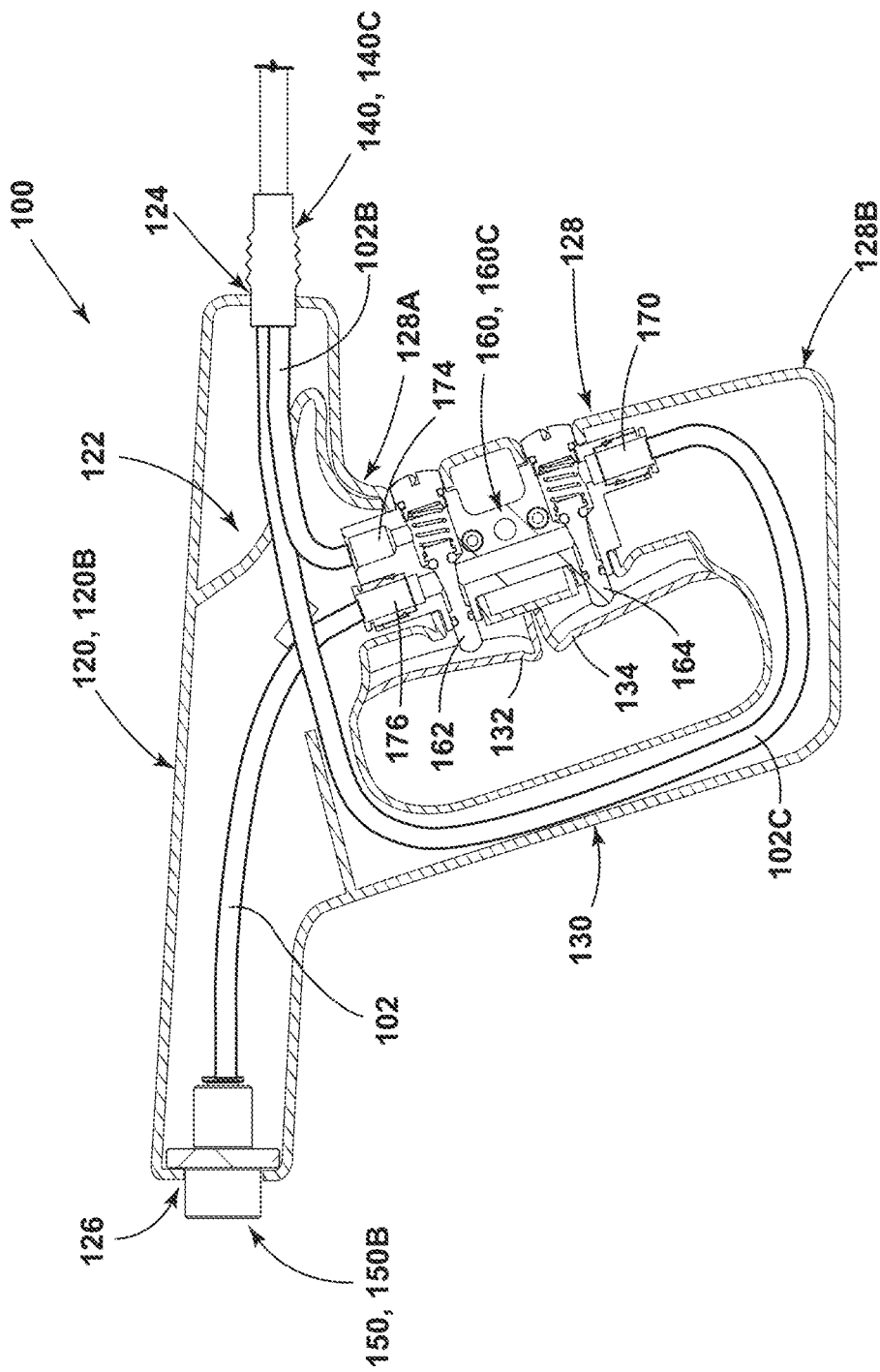
FIG. 10 is a cross-sectional side view of the fluid spray apparatus of FIG. 9 in accordance with the present disclosure.
Figure 11:
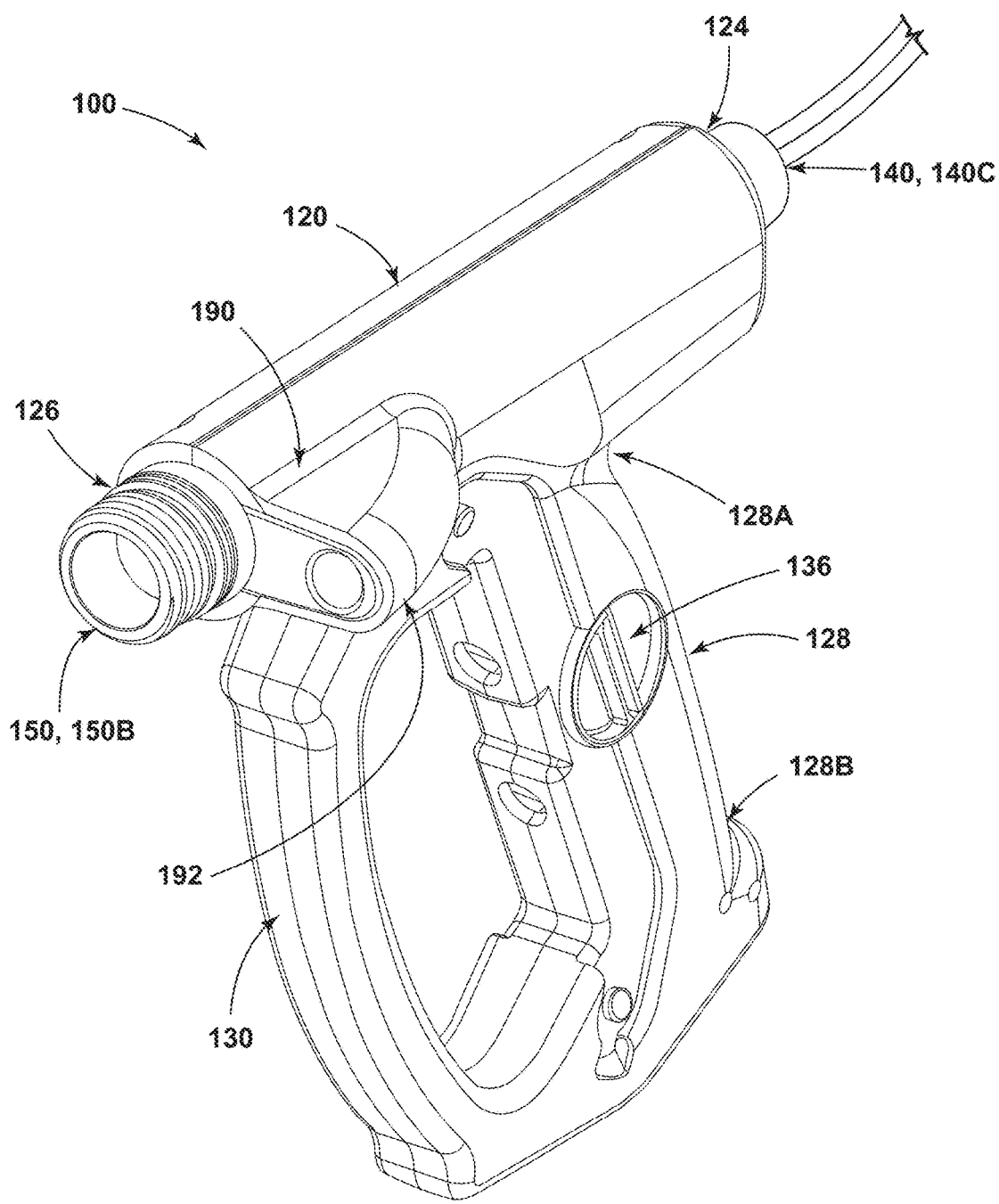
FIG. 11 is a perspective view of an embodiment of a fluid spray apparatus in a first configuration in accordance with the present disclosure.
Figure 12:
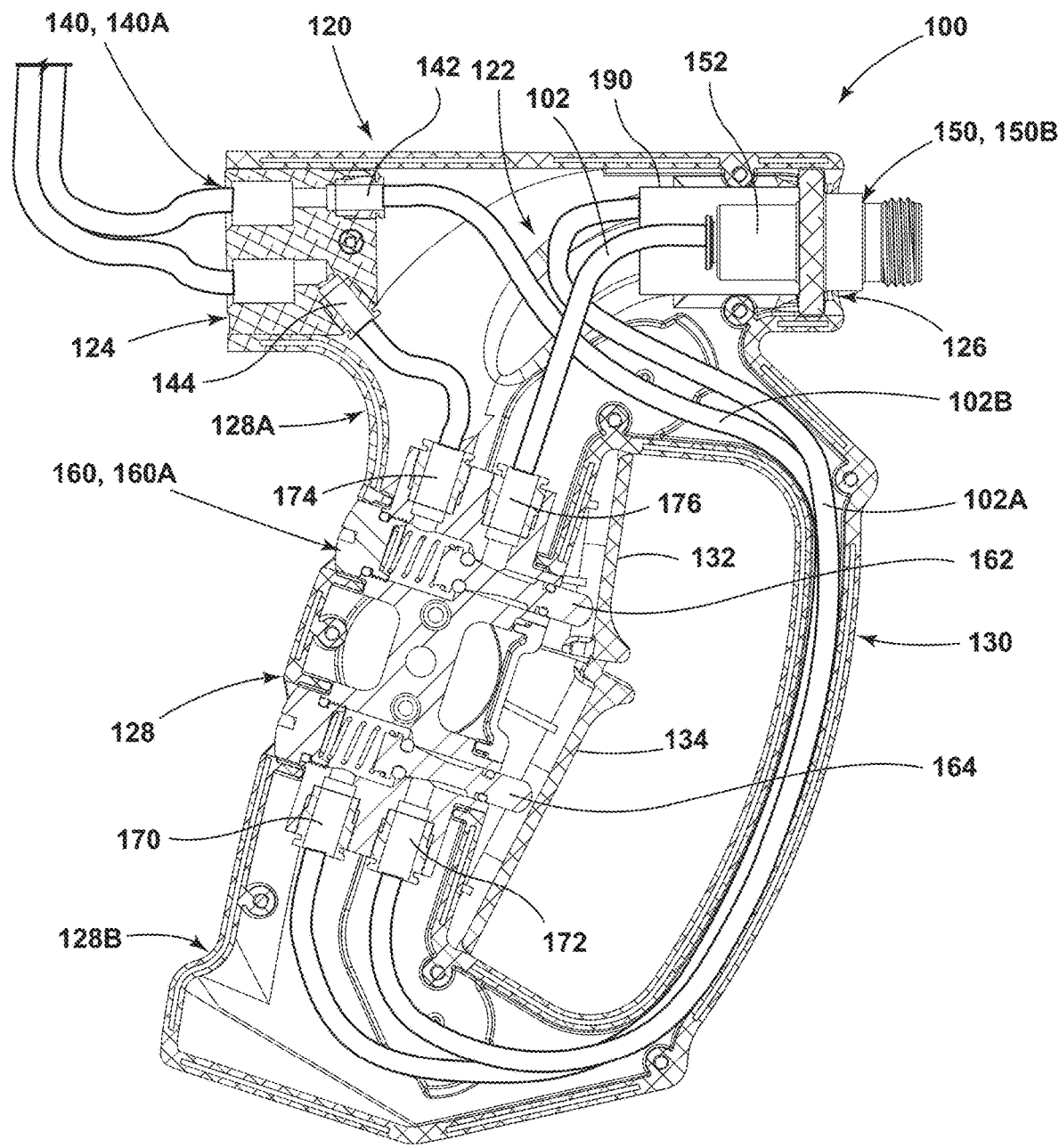
FIG. 12 is a cross-sectional side view of the fluid spray apparatus of FIG. 11 in accordance with the present disclosure.

Referring to FIGS. 11-12, a dual outlet version of the fluid sprayer apparatus 100 (e.g., lawn sprayer) of FIGS. 9-10 is illustrated. FIG. 11 is illustrated without the first and second triggers 132, 134. FIGS. 11-12 illustrate use of a twin line hose, rather than a coaxial hose, for supplying fluids to the fluid spray apparatus 100. In accordance with this embodiment, the third inlet block 140C may be positioned in the inlet opening 124 of the sprayer housing 120 and the second outlet block 150B may be positioned in the outlet opening 126 of the sprayer housing 120. The sprayer housing 120 may further include a side outlet opening 190 configured to receive a side outlet block 192. In certain embodiments, the second outlet block 150B and the side outlet block 192 may be integrally formed. In accordance with this embodiment is illustrated in FIG. 12, the fluid sprayer apparatus 100 may utilize the first valve block 160A for coupling the second inlet 144 of the first inlet block 140A to the second outlet block 150B (e.g., via the upper inlet 174 and the upper outlet 176). Likewise, the fluid sprayer apparatus 100 may utilize the first valve block 160A for coupling the first inlet 142 of the first inlet block 140A to the side outlet block 192 (e.g., via the lower inlet 170 and the lower outlet 172). Rather than injecting a second chemical into the stream sprayed from the second outlet block 150B, the second chemical is sprayed via the side outlet block 192. The description of the fluid sprayer 100 as illustrated in FIGS. 3-4 may be applicable to the fluid sprayer 100 as illustrated in FIGS. 11-12.

In certain optional embodiments, other configurations of the fluid sprayer apparatus 100 may be possible, for example, including three or more inlets, three or more outlets, three or more actuators, three or more triggers, or various combinations of the several embodiments described herein. For example, it may be envisioned that the embodiment illustrated in FIGS. 3-4, may implement the lawn sprayer between one of the inlets and one of the outlets, and further include a third actuator as part of the interchangeable valve block 160 for communicating the other inlet with the other outlet. Certain optional embodiments may include two, three, or even more tubes positioned within the hollow handle guard 130. In further optional embodiments, the different inputs and outputs of the various blocks 140, 150, 160 may be sized to meter different input fluids relative to each other.

In some embodiments, the exterior port(s) of the interchangeable inlet block 140 or the interchangeable outlet block 150 may be threaded, barbed, push-fit, or the like, depending upon the needs of a user. Further, the exterior port(s) of the interchangeable outlet block 150 may be configured to receive a nozzle configured to dispense liquid according to a specific pattern, such as, for example, fan spray nozzle of a set degree (e.g., 10°, 15°, 20°, 25°, 30°, or the like), an adjustable fan spray nozzle, a shower nozzle, a solid stream nozzle, or the like, depending upon the needs of a user. The internal port(s) of the interchangeable inlet blocks 140, the interchangeable outlet blocks 150, and the interchangeable valve blocks 160 may be threaded, barbed, push-fit, or the like.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Although embodiments of the present invention have been described in detail, it will be understood by those skilled in the art that various modifications can be made therein without departing from the spirit and scope of the invention as set forth in the appended claims.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this disclosure except as set forth in the following claims.

What is claimed is:

1. A fluid spray system comprising:
a plurality of interchangeable inlet blocks, each having a different configuration;
a plurality of interchangeable outlet blocks, each having a different configuration;
a plurality of interchangeable valve blocks, each including first and second actuators configured to fluidly communicate at least a portion of one of the plurality of interchangeable inlet blocks with at least a portion of one of the plurality of interchangeable outlet blocks using a plurality of tubes; and
a sprayer housing including a hollow interior, an inlet opening, and an outlet opening, the inlet opening configured to receive one of the plurality of interchangeable inlet blocks, the outlet opening configured to receive one of the plurality of interchangeable outlet blocks, the hollow interior of the sprayer housing configured to receive one of the plurality of the interchangeable valve blocks.

2. The fluid spray system of claim 1, wherein a first valve block of the plurality of interchangeable valve blocks includes a lower inlet, a lower outlet, an upper inlet, and an upper outlet, the upper inlet selectively communicated with the upper outlet using the first actuator, the lower inlet selectively communicated with the lower outlet using the second actuator.

3. The fluid spray system of claim 2, wherein:
a first inlet block of the plurality of interchangeable inlet blocks includes first and second inlets coupled to different ones of the upper and lower inlets of the first valve block; and
a first outlet block of the plurality of interchangeable outlet blocks includes first and second outlets coupled to different ones of the upper and lower outlets of the first valve block.

4. The fluid spray system of claim 3, wherein:
a first outlet tube of the plurality of tubes is coupled between the upper outlet of the first valve block and the first outlet of the first outlet block; and
a second outlet tube of the plurality of tubes is coupled between the lower outlet of the first valve block and the second outlet of the first outlet block.

5. The fluid spray system of claim 4, wherein:
the sprayer housing includes a handle portion and a hollow handle guard coupled between upper and lower ends of the handle portion and open to the hollow interior; and
a portion of the second outlet tube is positioned within the hollow handle guard.

6. The fluid spray system of claim 1, wherein a second valve block of the plurality of interchangeable valve blocks includes a lower inlet, a lower outlet, and an upper outlet, the lower inlet selectively communicated with the upper outlet via an internal passageway of the second valve block using the first actuator, the lower inlet further selectively communicated with the lower outlet using the second actuator.

7. The fluid spray system of claim 6, wherein:
a second inlet block of the plurality of interchangeable inlet blocks includes a single inlet coupled to the lower inlet of the second valve block; and
a first outlet block of the plurality of interchangeable outlet blocks includes first and second outlets coupled to different ones of the upper and lower outlets of the second valve block.

8. The fluid spray system of claim 6, wherein:
a first outlet tube of the plurality of tubes is coupled between the upper outlet of the first valve block and the first outlet of the first outlet block; and
a second outlet tube of the plurality of tubes is coupled between the lower outlet of the first valve block and the second outlet of the first outlet block.

9. The fluid spray system of claim 8, wherein:
the sprayer housing includes a handle portion and a hollow handle guard coupled between upper and lower ends of the handle portion and open to the hollow interior; and
at least a portion of the second outlet tube is positioned within the hollow handle guard.

10. The fluid spray system of claim 1, wherein a third valve block of the plurality of interchangeable valve blocks includes a lower inlet, an upper inlet, and an upper outlet, the upper inlet selectively communicated with the upper outlet using the first actuator, the lower inlet further selectively communicated with the upper outlet via an internal passageway of the third valve block using the second actuator.

11. The fluid spray system of claim 10, wherein:
a third inlet block of the plurality of interchangeable inlet blocks comprises an injector-style single inlet block including a single coaxial external inlet and first and second internal outlets coupled to different ones of the upper and lower inlets of the third valve block; and
a second outlet block of the plurality of interchangeable outlet blocks includes a single outlet coupled to the upper outlet of the third valve block.

12. The fluid spray system of claim 11, wherein:
a first inlet tube of the plurality of tubes is coupled between the first internal outlet of the third inlet block and the lower inlet of the third valve block; and
a second inlet tube of the plurality of tubes is coupled between the second internal outlet of the third inlet block and the upper inlet of the third valve block.

13. The fluid spray system of claim 12, wherein:
the sprayer housing includes a handle portion and a hollow handle guard coupled between upper and lower ends of the handle portion and open to the hollow interior; and
at least a portion of the second inlet tube is positioned within the hollow handle guard.

14. The fluid spray system of claim 1, wherein:
the sprayer housing includes a handle portion and a hollow handle guard coupled between upper and lower ends of the handle portion and open to the hollow interior; and
the fluid spray system further includes first and second triggers configured to selectively actuate the first and second actuators, respectively, the first trigger pivotally coupled to the handle portion closer to the upper end than to the lower end, and the second trigger pivotally coupled to the handle closer to the lower end than to the upper end.

15. The fluid spray system of claim 14, wherein:
the handle portion includes a safety selector positioned between the upper and lower ends of the handle portion, the safety selector configured to selectively prevent the first and second triggers from being able to actuate the first and second actuators.

16. The fluid spray system of claim 14, wherein:
the inlet opening of the sprayer housing is positioned at a lower end of the handle portion; and
the outlet opening is positioned at an upper forward end of the sprayer housing.

17. The fluid spray system of claim 14, wherein:
the inlet opening of the sprayer housing is positioned at an upper rear end of the sprayer housing above the handle portion; and
the outlet opening is positioned at an upper forward end of the sprayer housing.

18. The fluid spray system of claim 1, wherein:
the sprayer housing is a two-piece housing having a first portion and a second portion.

19. The fluid spray system of claim 18, wherein:
the first and second portions of the sprayer housing bisect the sprayer housing into two approximately equal halves.

20. A fluid spray apparatus comprising:
a two-piece sprayer housing including a hollow interior, an inlet opening, and an outlet opening, a handle portion, and a hollow handle guard coupled between upper and lower ends of the handle portion and open to the hollow interior;
an interchangeable inlet block configured to be received by the inlet opening and including at least one inlet;
an interchangeable outlet block configured to be received by the outlet opening and including at least one outlet;
an interchangeable valve block positioned within the hollow interior at the handle portion of the two-piece sprayer housing, the interchangeable valve block including first and second actuators extending from the two-piece sprayer housing towards the hollow handle guard, the interchangeable valve block configured to selectively communicate the interchangeable inlet block with the interchangeable outlet block; and
a plurality of tubes positioned within the two-piece sprayer housing and selectively coupled between the interchangeable inlet block, the interchangeable valve block, and the interchangeable outlet block, wherein at least a portion of one or more of the plurality of tubes is positioned within the hollow handle guard extending between the upper and lower ends of the handle portion.

* * * * *